Figure 1:
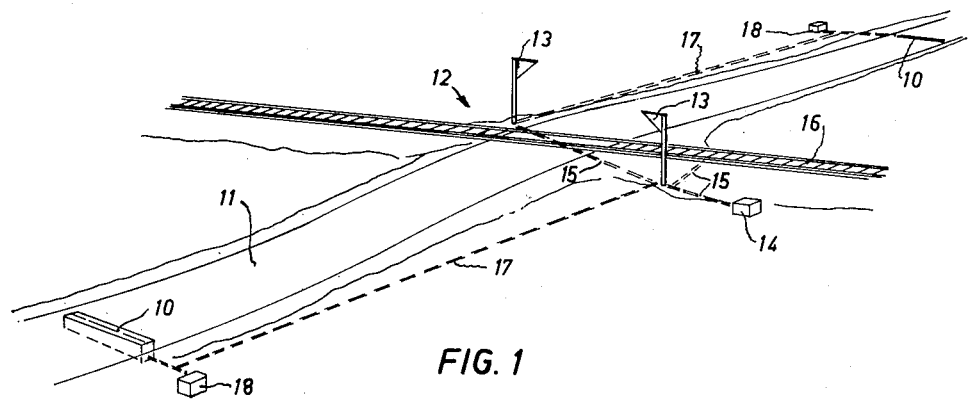

Jan. 3, 1956   D. R. STRUKE   2,729,805
RAILWAY CROSSING APPROACH SIGNAL
Filed Jan. 12, 1955

INVENTOR
Douglas R. Struke

# United States Patent Office 2,729,805
Patented Jan. 3, 1956

2,729,805

RAILWAY CROSSING APPROACH SIGNAL

Douglas R. Struke, Brampton, Ontario, Canada

Application January 12, 1955, Serial No. 481,448

9 Claims. (Cl. 340—31)

This invention relates to a railway crossing approach signal device of a noise and vibration type adapted to be actuated by electrical signalling means responsive to the approach of a railway train on a track intersecting the roadway on which the signal device of the invention is installed.

A variety of devices have been used for warning a driver of an automobile approaching a level crossing. While bell systems and visual signals have formerly been proposed, none of the prior systems is effective through a heavy noise or visual barrier.

It is the main object of the present invention to provide a signal device creating vibration and noise directly transmittable to the driver of an automobile.

It is another object of the invention to provide a signal device operatively related to a conventional level crossing signal mechanism and adapted to transmit noise and vibration directly to an automobile and driver approaching the crossing when said mechanism is emanating a warning signal.

Other objects of the invention will be appreciated by a study of the following specification taken in conjunction with the accompanying drawings.

Figure 2:
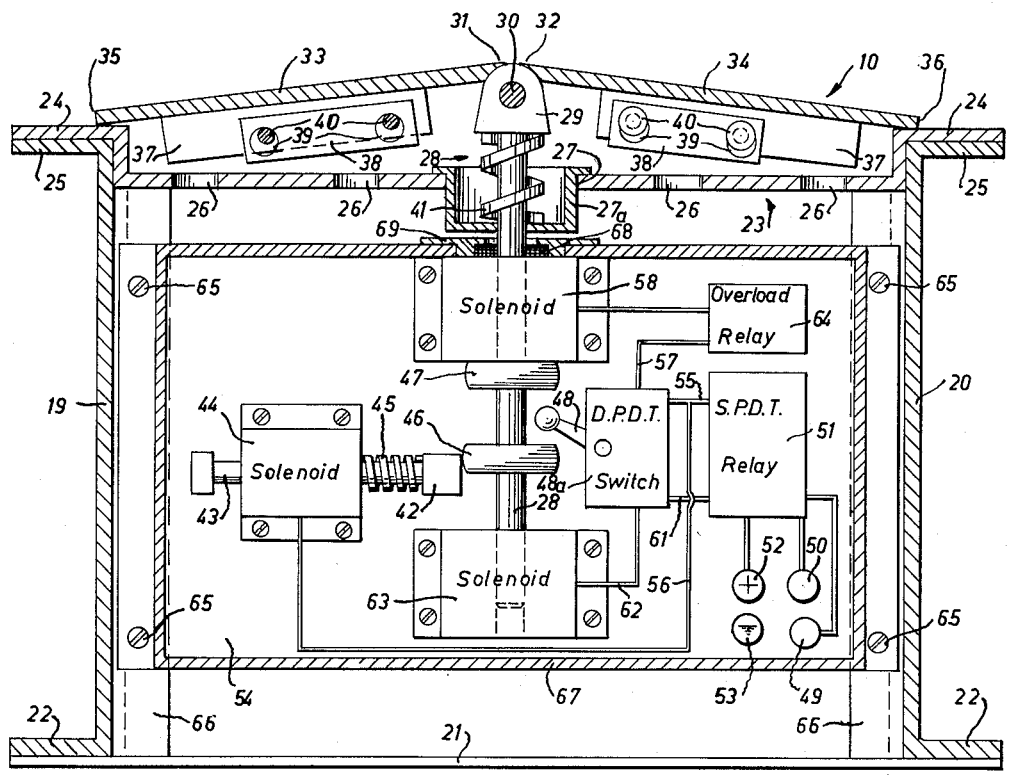

In the drawings:

Figure 1 is a perspective illustration of the signal device and system of the invention in use; and Figure 2 is a transverse sectional view of the signal device of the invention revealing the operating elements.

Referring to Figure 1, noise and vibration signalling devices 10 of the invention are located transversely of highway 11 a substantial distance from crossing 12. Conventional electrically actuated signalling mechanisms 13 are energized by a battery power supply 14 through cables 15 connecting to track 16. Devices 10 are operatively related through cables 17 to signal mechanisms 13 and are energized by battery power supply 18 or supply 14 when the latter is provided in a heavy duty form.

When the signal mechanisms 13 are energized upon approach and passing a railway train on track 16 over crossing 12 in the usual manner, devices 10 rise slightly above the surface of highway 11 whereby an automobile passing thereover effects a noisy vibration or crashing sound and jarring effect transmitted into the frame of the automobile and hence to the driver to provide a physical and audible warning to the driver, while permitting the automobile freely to proceed toward the crossing. The devices 10 do not therefore constitute a barrier and are designed to avoid throwing any vehicle such as a motorcycle out of control while passing thereover, as will be apparent in the following detailed description of one preferred construction thereof.

The device 10 is shown in transverse section in Figure 2 and comprises the side members in the form of channels 19 and 20 having transverse spacing straps 21 welded to the bottom flanges 22 thereof. A perforated trough 23 having seating flanges 24 rests on upper flanges 25 of channels 19 and 20 and has a plurality of holes 26 therein. At the section shown, an enlarged central hole 27 carrying support cup 27a freely accommodates an upwardly spring-biased operating shaft 28 having a hinge fitting 29 at its upper end adapted to receive hinge pin 30 supporting inner edges 31 and 32 of tread plates 33 and 34 respectively, which latter are hinged therefrom. The outer edges 35 and 36 respectively, slidably ride on upper surfaces of trough flanges 24.

Bars 37 extend downwardly from the tread plates to support the latter on trough plate 23 when the tread plates are aligned, i. e., lowered to a level position. Upon moving toward the level position from the raised position shown, the crash or noise plates 38 loosely suspended by enlarged openings 39 on pins 40 first meet the trough plates 23 creating a loud crashing clanging noise which, in conjunction with the jarring of bars 37 meeting the trough plate 23, effects transmission of noise and vibration through the wheel of the vehicle passing thereover.

In operation, the tread plates 33 and 34 are normally retained in the downward or level position against the biasing pressure of spring 41 by the locking head 42 of the piston 43 of solenoid 44 under action of locking compression spring 45. In the level or retracted position, collar 46 on shaft 28 is disposed below and retained by locking head 42 below collar 47 also fixed to shaft 28 a predetermined distance therefrom.

The switch arm 48 of double pole double throw snap-acting switch 48a of well known construction will normally be disposed in the downward position.

When a signal mechanism 13 of Figure 1 is energized, electrical current therefrom passes through cable 17 to terminals 49 and 50 energizing the single pole double throw relay of well known construction designated by numeral 51 closing an electrical circuit from battery 18 connected to positive terminal 52 and grounded terminal 53 through the grounded mounting panel 54 and lines 55, 56 and 57, causing energization of solenoid 44 withdrawing locking head 42. Simultaneously, solenoid 58 of conventional construction, draws shaft 28 upwardly until collar 47 limits the upward travel thereof raising the tread plates 33 and 34. It is to be noted that the switch arm 48 of switch 48a under its characteristically known action will proceed further in its upward motion to the position shown in Figure 2 and that in the final motion of passing to this position, will disconnect the lines 55 and 57.

Accordingly, once the tread plates have arrived at the raised position shown, the solenoid 58 will be de-energized whereas locking head 42 will be maintained in the withdrawn position as energization of solenoid 44 is maintained. If, however, an automobile passing over tread plates 33 and 34 depresses them against the force of the relatively light spring 41 otherwise maintaining them in the raised position, switch arm 48 will be pushed downwardly by collar 47 again completing the electrical circuit through lines 55 and 57 to energize solenoid 58 raising shaft 28 as before.

Upon de-energization of signal mechanisms 13, relay 51 will be de-energized, opening the circuit to lines 55 and 56 and connecting positive terminal 52 to line 61, the latter at this point of operation being connected by switch 48a in the position shown to line 62 thereby energizing the lowering solenoid 63. Shaft 28 is thereupon drawn downwardly against pressure of spring 41 until locking head 42 rides over collar 46 under action of spring 45. In completing the downward motion, switch arm 48 is snapped to the downward position disconnecting lines 61 and 62 de-energizing solenoid 63.

The device of the invention is operative without the solenoids 58 and 63 with a normally open single pole relay replacing relay 51 and controlling energization of locking solenoid 44. Thus, assuming suitable sliding support for shaft 28 replacing solenoids 58 and 63, the tread plates in such case will be depressed by a vehicle passing thereover and will rise under action of spring 41. However, if spring 41 is too strong, the tread plates will not be depressed by a light vehicle, as for example, a motorcycle and thus the device of the invention so modified would provide in effect an obstruction sufficient to cause a vehicle travelling at high speed to be thrown out of control. Moreover, in such modification, the device could be brought to the normal position only by passage of a vehicle thereover after de-energization of locking solenoid 44. This could occur some time after the signal mechanisms ceased to give warning. The thus modified device could give a false alarm and is therefore not preferred, though contemplated as forming a part of this invention.

Accordingly, the device of the invention in the form shown in Figure 2 embodies solenoids 58 and 63 for the respective purposes of positively lifting the tread plates to the raised position at which they are maintained by light spring 41. The tread plates are positively lowered to avoid a false alarm once a warning signal is no longer required. In the event the tread plates are to be raised while a vehicle is resting thereon, overload relay 64 of conventional construction electrically in series in line 57 with solenoid 58, opens the circuit thereof. Shaft 28 in that portion above the solenoid 58 as shown in Figure 2, is formed of a non-magnetic material such as bronze.

The grounded mounting panel 54 is fastened by screws 65 to posts 66. The panel 54 mounts a weatherproof housing with side walls 67 shown in section but having a removable coverplate (not shown). Shaft 28 passes through the sealing ring 68 held by fitting 69. Accordingly, water passing through holes 26 of the trough plate 23 may fall over the thus weather-sealed housing and panel described to be drained off in any suitable manner below straps or spacers 21.

By way of summary, it may be noted that the invention concerns a device for warning a driver of a vehicle passing thereover along a road surface approaching a railroad level crossing or the like wherein the said device is responsive to an exterior signal such as an electrical signal from a conventional wig-wag mechanism but actuable by a vehicle passing thereover to create noise and vibration transmittable through the vehicle to the driver.

In general arrangement, a pair of tread plates are joined at adjacent edges by a common hinge, the other edges of the tread plates being parallel thereto and slidably supported in alignment with the road surface but transversely of the direction of traffic thereon as indicated in Figure 1. Shaft 28 depends from hinge pivot 30 and is slidably supported vertically such as by solenoids 58 and 63 having sleeve bearings therein (not shown). Spring 41 raises the shaft and tread plates to a predetermined downwardly deflectable position determined by collar 47 as shown in the construction of Figure 2. Releasable locking means, i. e., the solenoid retractable locking head 42, normally retains the tread plates in alignment, i. e., level against the upward pressure of spring 41. Means responsive to an exterior signal in the form of relay 51, battery 18 and solenoid 44, release the locking head. Noise devices 37 and 38 are active upon downward deflection of the tread plates by a vehicle passing thereover.

What I claim as my invention is:

1. A device for warning the driver of a vehicle passing thereover on a road surface and comprising: a downwardly deflectable tread plate; means supporting one edge of said tread plate substantially in alignment with said road surface and transversely of normal vehicle motion thereover; a spring pivotally urging said tread plate substantially on said edge to a raised position; retractable locking means normally retaining the upper surface of said tread plate in alignment with said road surface against the pressure of said spring; means retracting said locking means responsive to an exterior signal; and means operatively connected to said tread plate creating a warning noise and vibration upon downward deflection of said tread plate from the raised position by a vehicle passing thereover, said noise and vibration being in part communicated directly to said vehicle and the driver thereof by said tread plate.

2. A device for warning the driver of a vehicle passing thereover on a road surface and comprising, in combination: a pair of tread plates including common hinge means therefor disposing said plate in abutting relationship when aligned; means for supporting the periphery of said hinged tread plates substantially in alignment with a road surface; a spring urging said tread plates upwardly in the region of said hinge to a raised position; retractable locking means normally retaining the upper surfaces of said tread plates in alignment with said road surface against the pressure of said spring; means responsive to an exterior signal for retracting said locking means and releasing said tread plates to the raised position under action of said spring; and means operatively connected to said tread plates for creating a warning vibration and noise upon downward deflection of said plates by a vehicle passing thereover, said warning being in part communicated directly to said vehicle and the driver thereof by said tread plates.

3. A device for warning the driver of a vehicle passing thereover along a road surface and comprising in combination: a pair of tread plates having adjacent edges joined by a common hinge and having outer edges parallel to said adjacent edges; means adapted to slidably support said outer edges in alignment with a road surface and transversely of normal vehicle motion over said surface; a shaft depending from said hinge; means slidably supporting said shaft substantially vertically; a spring raising said shaft and the hinge of said tread plates above the outer edges of the latter to a predetermined downwardly deflectable position; releasable locking means normally retaining said shaft in a position holding said tread plates in alignment in opposition to the pressure of said spring; means responsive to an exterior signal for releasing said locking means; and means operatively connected to said tread plates for creating a warning vibration and noise upon downward deflection of said tread plates by a vehicle passing thereover, said warning being in part communicated directly to said vehicle and the driver thereof through said tread plates.

4. A warning device as claimed in claim 3 and means responsive to said exterior signal for raising said shaft to said predetermined position.

5. A warning device as claimed in claim 3 and means responsive to termination of said exterior signal for lowering said shaft and tread plates to a position of alignment retained by said locking means.

6. A warning device as claimed in claim 3 and the combination therewith, of: means responsive to said exterior signal for raising said shaft and tread plates to said predetermined position; and means rendering said shaft raising means unresponsive to said signal at said predetermined position and during deflection of said tread plates by a vehicle passing thereover.

7. A warning device as claimed in claim 3 and the combination therewith of: means responsive to said exterior signal for raising said shaft and tread plates to said predetermined position; means rendering said shaft raising means unresponsive to said signal at said predetermined position and during deflection of said tread plates by a vehicle passing thereover; and means responsive to termination of said exterior signal for lowering said shaft and tread plates to a position of alignment retained by said locking means.

8. A warning device as claimed in claim 3 and the combination therewith of: means responsive to said exterior signal for raising said shaft and tread plates to said predetermined position; means rendering said shaft raising means unresponsive to said signal at said predetermined position and during deflection of said tread plates by a vehicle passing thereover; means responsive to termination of said exterior signal for lowering said shaft and tread plates to a position of alignment of the latter retained by said locking means; and means rendering said shaft lowering means inactive when said tread plates are retained in a position of alignment by said locking means.

9. A warning device as claimed in claim 3 and the combination therewith of: means responsive to said exterior signal for raising said shaft and tread plates to said predetermined position; means rendering said shaft raising means unresponsive to said signal at said predetermined position and during deflection of said tread plates by a vehicle passing thereover; means responsive to termination of said exterior signal for lowering said shaft and tread plates to a position of alignment of the latter retained by said locking means; means rendering said shaft lowering means inactive when said tread plates are retained in a position of alignment by said locking means; and an enclosure for said means for raising and lowering said shaft and the locking means therefor.

References Cited in the file of this patent

UNITED STATES PATENTS 1,860,685     Morris _____ May 31, 1932

FOREIGN PATENTS 652,772     France _____ Dec. 29, 1928